July 14, 1964

L. G. SYMONS 3,140,834

SEAL FOR GYRATORY CRUSHERS

Filed Nov. 14, 1961

6 Sheets-Sheet 1

INVENTOR.
Loren G. Symons,
BY Parker & Carter
Attorneys.

July 14, 1964  L. G. SYMONS  3,140,834
SEAL FOR GYRATORY CRUSHERS
Filed Nov. 14, 1961  6 Sheets-Sheet 2
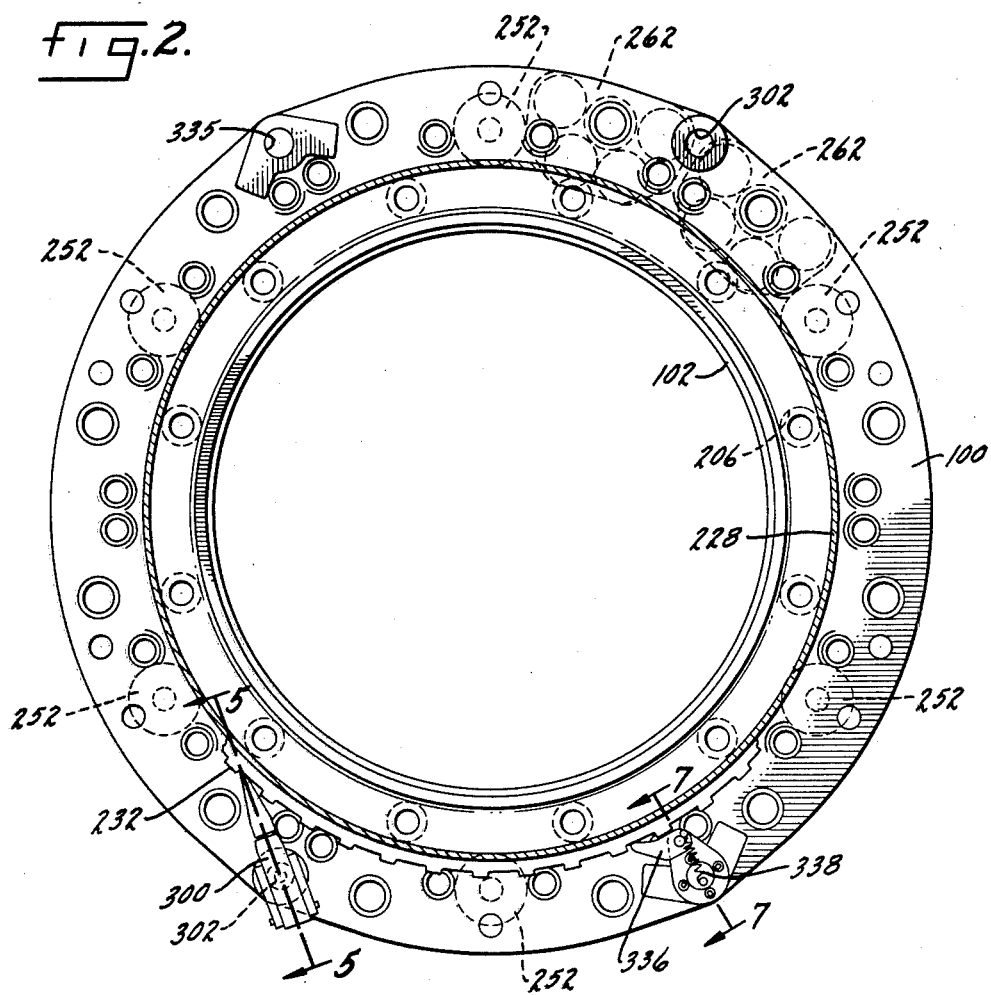
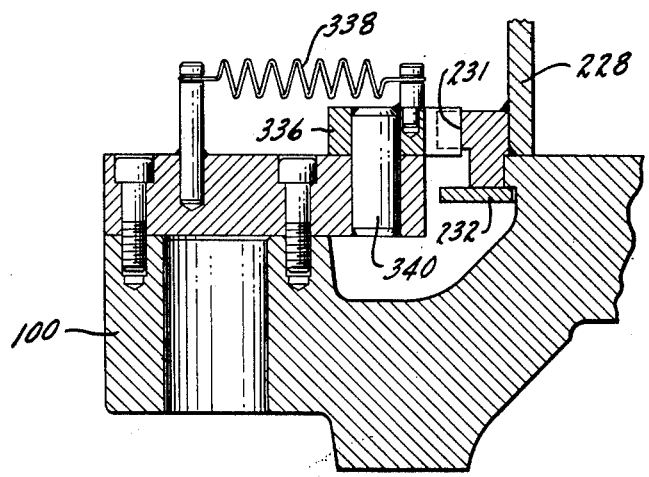
INVENTOR.
Loren G. Symons,
BY Parker & Carter
Attorneys.

July 14, 1964 L. G. SYMONS 3,140,834
SEAL FOR GYRATORY CRUSHERS
Filed Nov. 14, 1961 6 Sheets-Sheet 4
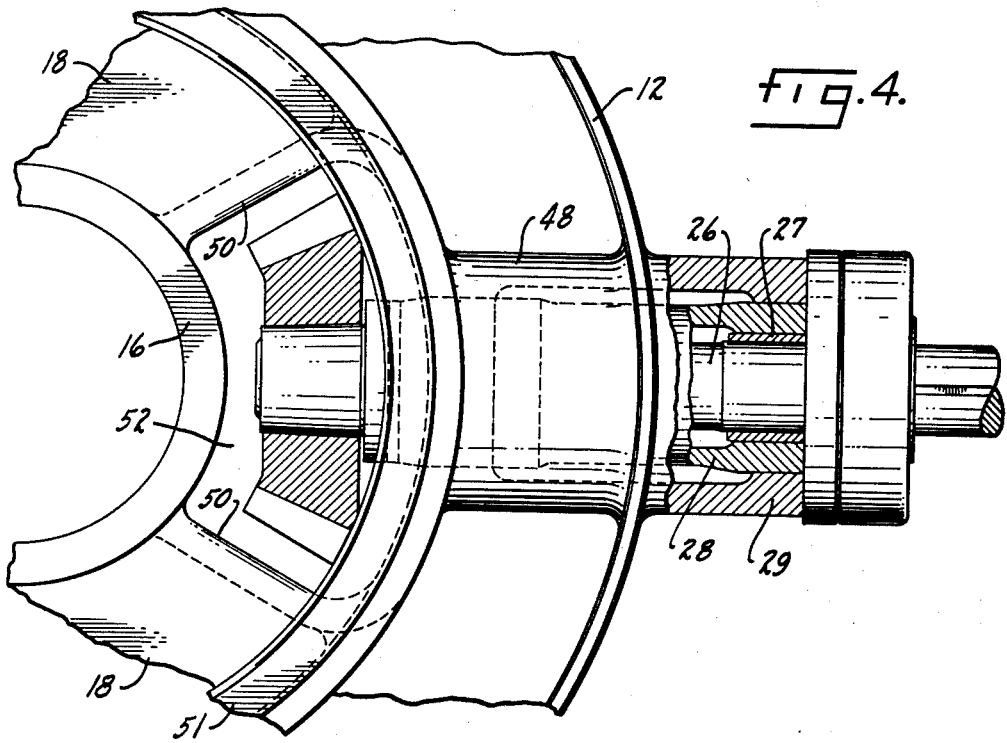
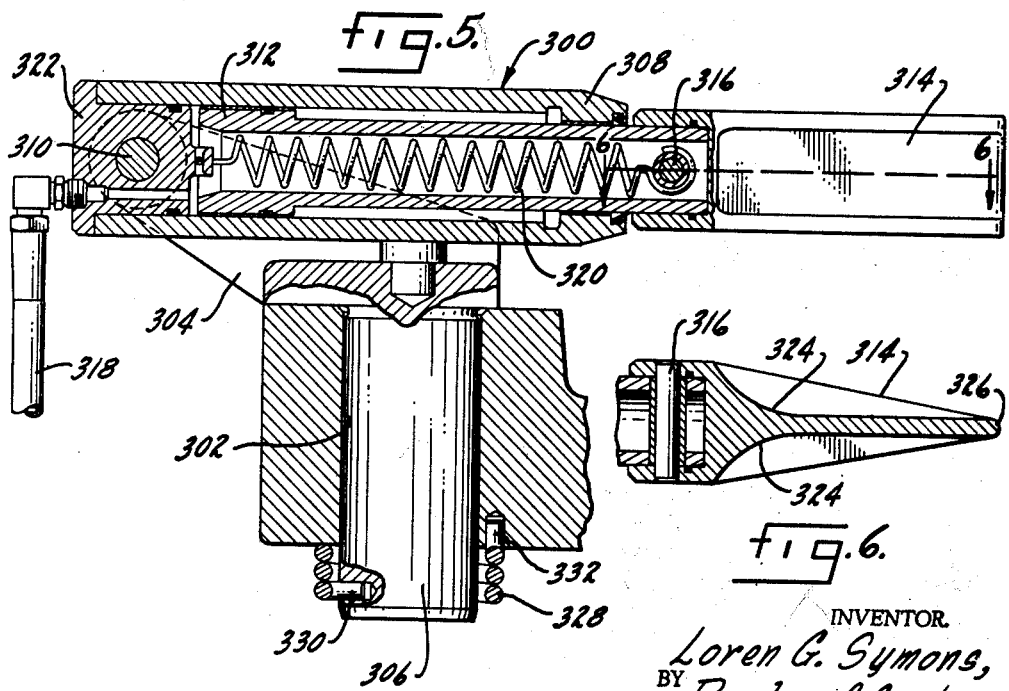
INVENTOR.
Loren G. Symons,
BY Parker & Carter
Attorneys.

July 14, 1964

L. G. SYMONS 3,140,834

SEAL FOR GYRATORY CRUSHERS

Filed Nov. 14, 1961

6 Sheets-Sheet 5 fig.8.

INVENTOR.
Loren G. Symons,
BY Parker & Carter
Attorneys.

July 14, 1964
L. G. SYMONS
3,140,834
SEAL FOR GYRATORY CRUSHERS
Filed Nov. 14, 1961
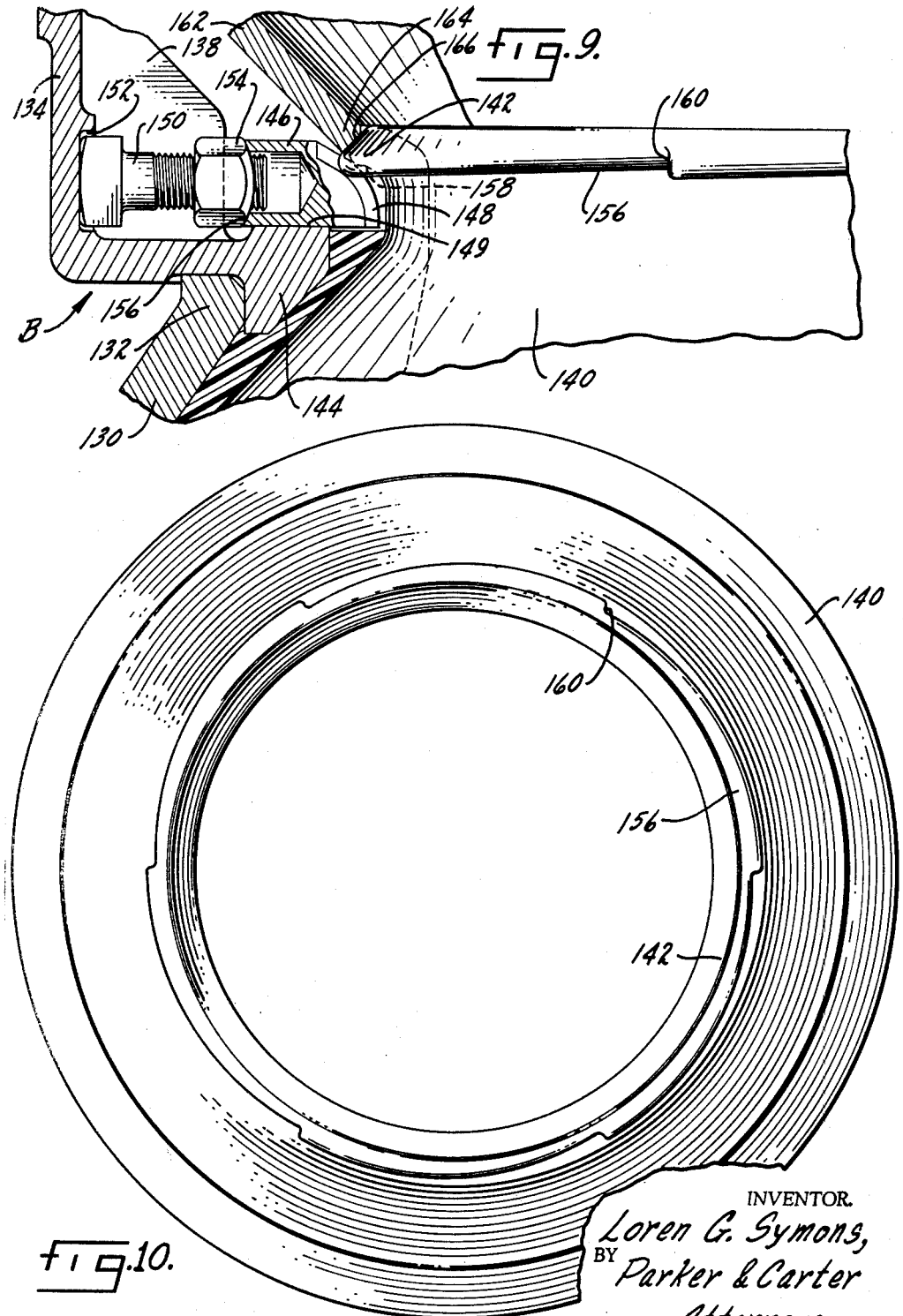
INVENTOR.
Loren G. Symons,
BY Parker & Carter
Attorneys.

United States Patent Office 3,140,834
Patented July 14, 1964

3,140,834
SEAL FOR GYRATORY CRUSHERS
Loren G. Symons, North Hollywood, Calif., assignor to Nordberg Manufacturing Company, Milwaukee, Wis., a corporation of Wisconsin
Filed Nov. 14, 1961, Ser. No. 152,221
6 Claims. (Cl. 241—216)

This invention is in the field of material reduction machines and is concerned, among other things, with an improved gyratory crusher.

A primary object of the invention is an improved gyratory crusher which is efficient in use.

Another object is a power adjustment for the bowl of a gyratory crusher.

Another object is an adjustment or tilting ring and frame for a gyratory crusher which avoids abrasive or adhesive wear on their contacting surfaces.

Another object is an improved seal for the head of a gyratory crusher.

Another object is an improved bowl liner for a gyratory crusher.

Another object is an improved eccentric for the head of a gyratory crusher.

Another object is an improved locking arrangement for the bowl liner of a gyratory crusher.

Another object is improved wearing parts for a gyratory crusher.

Another object is a flexible system for varying the crushing cavity contours of a gyratory crusher.

Figure 1:
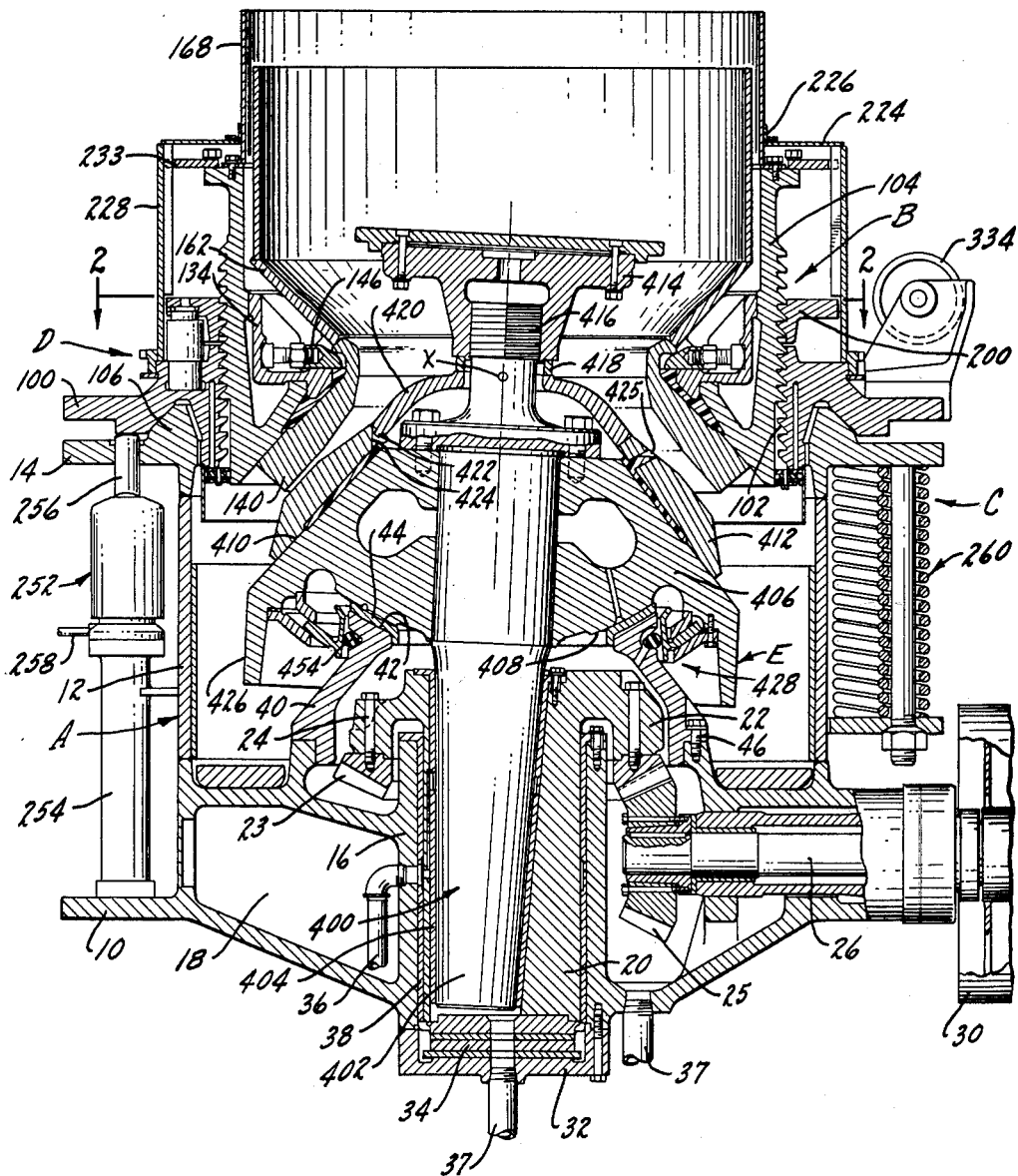
Figure 3:
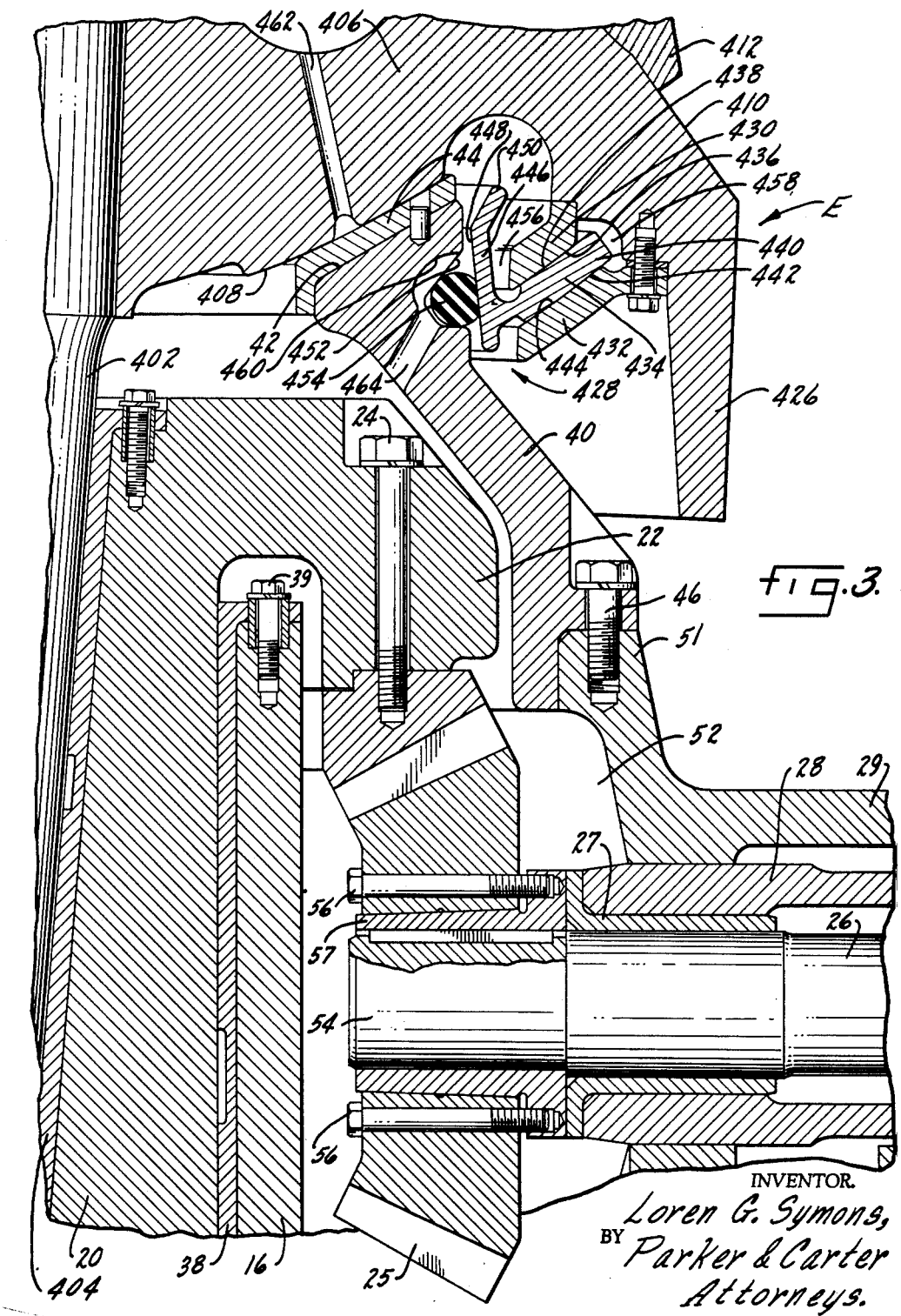

Other objects will appear from time to time in the ensuing specification and drawings in which:

FIGURE 1 is a vertical section of a gyratory crusher;
FIGURE 2 is a section along line 2—2 of FIGURE 1, with parts removed for clarity;
FIGURE 3 is an enlarged view of a portion of FIGURE 1;
FIGURE 4 is a top plan view, partly in section, of the frame and drive;
FIGURE 5 is a section along line 5—5 of FIGURE 2, on an enlarged scale;
FIGURE 6 is a section along line 6—6 of FIGURE 5;
FIGURE 7 is a section along line 7—7 of FIGURE 2 on an enlarged scale;
FIGURE 8 is a portion of FIGURE 1, on an enlarged scale;
FIGURE 9 is a portion of FIGURE 1, on an enlarged scale, partially in full; and
FIGURE 10 is a top view of the liner, partially shown in FIGURE 9.

In FIGURE 1, a crusher has been shown generally including the following main parts, a main frame A which supports a bowl structure B releasably held on the main frame by a release mechanism C and arranged to be adjusted by an adjustment mechanism D. The main frame also supports a crushing head E defining a crushing cavity with the bowl.

The main frame A includes a base flange 10 with an upstanding housing 12 and a supporting flange 14 for the bowl structure at the upper end. The base flange is connected to a center hub 16 by a web structure 18. The center hub supports an eccentric 20 which has a suitable counterweight 22 at its upper end overhanging the upper end of the center hub and connected to a ring gear 23 by bolts 24 or the like, which in turn is driven by a pinion 25 on a drive shaft 26 which in turn may be driven by a belt and pulley arrangement or any suitable means, not shown.

The drive shaft may be supported by bearings 27 in a sleeve 28 suitably held in a boss or journal 29 which is a part of the frame with a pulley 30 or the like at the outer end of the shaft.

The lower end of the center hub is closed by a bottom cap 32 which houses a thrust bearing arrangement 34 of any suitable type supporting the eccentric. The hub may have a suitable lubricant inlet connection, as at 36, with outlets at 37, and a suitable bearing sleeve 38 may line the center hub around the eccentric, removably held in by bolts 39 or the like, in FIGURE 3. The webs around the center hub may be closed on top by a detachable annular support 40 which defines a socket 42 lined with a brass or bronze seat or liner 44 on its upper surface and described about a center of gyration X, for supporting the head. The support itself may be removably held on the main frame by bolts 46 or the like.

The main frame 12 may have the web structure 18 to the center hub 16 formed in cross section in a U, an H shape, or in a box or rod shape, as at 48 in FIGURE 4. It is preferred to use three such webs or arms. One of the arms 48 supports the drive shaft and sleeve, as shown in FIGURE 4, and the webs flare at 50 inside of the supporting ledge 51. The webs, center hub and supporting ledge thus form an upwardly opening pocket 52 so that when the head support 40 is removed, the drive pinion 25 may be inserted from above. To assemble the drive, the sleeve 28 with bearings and drive shaft are inserted through the arm 48. The drive pinion 25 is lowered into the pocket and the end 54 of the drive shaft is inserted into the pinion while the pinion is suspended in the pocket. Then the pinion may be connected to the end of the drive shaft by suitable bolts 56 or the like, which pull the pinion up on a tapered bushing or sleeve 57. Thus the inside of the arm 48 may have a much smaller dimension than the pinion. Further, the forces applied to the drive shaft are absorbed in the arm of the frame. The drive pinion may be readily removable, if removal is desired.

The bowl structure B may include an adjustment or tilting ring 100 screw-threaded as at 102 to a bowl 104. As shown in FIGURE 8, the adjustment ring rests on and is supported by an upstanding annular flange 106 on the main frame with the two having opposed upwardly and inwardly directed or convergent contacting or abutting surfaces 108 which constitute the sole support or contact between the bowl structure and frame. Each of the contacting surfaces includes an upper conic portion 110, shown as disposed at, roughly, a 45° angle to the crusher axis, followed on the lower outside by separating inwardly curved portions, 112 on the adjustment ring and 114 on the frame. The inwardly curved surfaces 112 and 114 may be formed each on a constant radius or they might be otherwise developed, depending upon the forces involved. When the adjustment ring 100 tilts up at one side of the crushing cavity due to uncrushable material in the cavity, the surfaces 112 and 114 at the opposite side of the adjustment ring and frame, contact, with the conic surfaces 110 separated. Within manufacturing limits, the force should always be normal to the point of contact between the surfaces 112 and 114.

The curve 112 is swung on a somewhat greater radius than the curve 114, so that when the bowl tilts on one side, the adjustment ring will roll on the other side with a smooth rolling contact with no slip between 112 and 114, without sliding or rubbing. At the upper inner end the conic surfaces 110 separate, as at 116, and the adjustment ring includes a depending skirt 118 which is threaded on its inner surface and is spaced from the main frame, as at 120 in FIGURE 8, on its outer surface.

The bowl proper is provided with a generally cylindrical outer portion 128 which has a threaded exterior and an inner somewhat frusto-conic portion 130 which rises and terminates in an annular shoulder or ledge 132. The ledge supports an annular adaptor or insert 134 which may be removably welded both to the shoulder 132 and to a back-up portion 136 higher up on the bowl. The insert may be generally L-shaped in cross section, having a troughlike appearance, opening generally upwardly and subdivided by webs or strengthening ribs 138 into a plurality of pockets.

A generally frusto-conic liner 140 has a continuous outwardly disposed ledge 142 at its upper end, in FIGURE 9. The inner portion 144 of the bowl insert projects inwardly and, in effect, functions as a back-up for the upper portion of the liner. The diameter of the inner portion of the insert is slightly greater than the outer diameter of the ledge 142 on the liner so that the liner may be raised up in the bowl in the position shown.

The liner is held in place by a plurality of wedge elements 146, shown in FIGURE 9, each of which may have a crowned forward surface 148 and slide on an annular flat surface 149 on the bowl insert. The wedge is forced radially inwardly under the ledge 142 on the liner by a bolt 150 or the like, which fits in a socket 152 in the insert. A thrust nut 154 on the bolt has a convex forward surface which fits in a corresponding concave surface or socket 156 in the rear of the wedge. Thus, the wedge may be forced inwardly against the liner by turning the thrust nut 154. The contacting surface 148 of the wedge is crowned or arcuate both vertically and horizontally.

As shown in FIGURES 9 and 10, the upper ledge or flange 142 at the top of the liner is formed into a plurality of segments or locking surfaces 156, each of which is helically disposed to the liner axis and swung on an arc eccentric to the liner axis, as shown in FIGURE 10. Six such locking surfaces have been shown, but it should be understood that more or less may be used. The under surfaces of the ledges are arcuate in cross section, at 158, and the return surface 160 between locking surfaces may be swung on a small arc or may be straight. The direction of the helix of each surface 156 is such, relative to the direction of rotation of the head, that the liner tends to tighten itself on the crowned faces of the wedges. The wedges may be differentially forced in against the locking surfaces 156 on the liner until the liner is pulled up firmly against the bowl proper.

A feed cone 162 is positioned above the crushing cavity which may rest with its lower end 164 against a blunt conical face 166 on the upper outer portion of the liner ledge. Otherwise, the feed cone may be loosely or freely held in place. The bowl may have an upper extension 168 which surrounds the feed cone.

In effect, a composite bowl structure is provided, i.e. the bowl proper 104 and an adapter or insert 134. The bowl proper may be used with a wide number of different bowl adapters or inserts, depending upon the desired contour of the bowl liner and the contour of the particular head or crushing member used. Depending upon whether a machine is for coarse, medium or fine crushing, the particular bowl insert or adapter may be inserted and adapted to the bowl proper 104. To adapt a crusher for a different purpose, one needs merely to substitute a different adapter.

When the liner 140 is worn out, the thrust nuts 154 can be backed off or the bolts may be torched out. This frees the wedges so that they can be backed off and the liner can be easily removed and replaced.

The release mechanism C may include a locking ring 200 screwthreaded to the bowl and disposed above the adjustment ring. The locking ring may have a plurality of downwardly opening individual sockets 202 on its lower surface for clamping units 204. Each clamping unit may be positioned in a corresponding upwardly opening socket 206 in the adjustment ring.

Each of the clamping units, such as shown in FIGURE 8, may include a cylindrical housing or cylinder 208 which carries a piston 210 having a rod 212 surrounded by a spring arrangement, shown in this case as a collection of axially aligned spring washers 214 which bear at their upper end against the piston and at their lower end against a seat ring 216 held in the cylinder by a suitable snap ring or the like. The rod extends through the top of the cylinder to bear against the locking ring at 218. The outside of the cylinder may have a shoulder at 220 which seats on the top of the adjustment ring. The dimensioning is such that the spring arrangement applies a vertical thrust between the adjustment ring and locking ring so that the clamping units, as a group, are effective around the crusher to apply an upthrust to the bowl through the locking ring. For example, 4, 6 or 8 such units may be positioned at spaced intervals about the crusher to apply a uniform upthrust to the locking ring and bowl. The total upthrust of all units may be just slightly more than the weight of the bowl structure so that thread clearance will be eliminated. On the other hand, the total upthrust may be sufficiently large so that it not only eliminates thread clearance but also binds the threads between the bowl and adjustment ring sufficiently to lock the bowl against rotation during normal crushing. Any number of upthrust units may be used.

The top of the piston 210 inside of each clamp unit may form a chamber 222 which may be connected to a suitable supply of high pressure hydraulic fluid or the like. All of the cylinders may be interconnected so that when high pressure fluid is supplied, the piston 210 in each unit will be forced down compressing the washer spring somewhat to lower the locking ring load. This frees the bowl for adjustment.

The threads between the bowl, adjustment ring and locking ring may be protected by a top cap 224 which is sealed at 226 to the bowl extension with a skirt 228 which rests at 230 on the adjustment ring. A torque ring 231 may be connected to the outside of the top cap and releasably held on the adjustment ring by a plurality of levers 232, shown in FIGURE 7, which pivot under a flange on the adjustment ring. The upper end of the bowl may be keyed to the top cap at 233 so that when the top cap is rotated, the bowl will be rotated and, at the same time, may move up or down. Since the thrust units are positioned between the adjustment ring and locking ring and socket into each, these units, in effect, key the locking ring to the adjustment ring so that one cannot rotate relative to the other.

The machine may have more sockets in the locking ring than there are clamping units 204. For example, six clamping units 204 may be provided with twelve sockets in the locking ring. It is preferred that the clamping units be spaced around the machine, for example in every other socket in the locking ring. In the event of excessive wear in the threads between the bowl and adjustment ring, the locking ring can be indexed or rotated down to make up the clearance caused by wear. The bowl assembly would first be backed out and removed, and then the locking ring would be picked up, rotated a given amount, and lowered back with different sockets on the clamping units.

The bottom of the threads between the bowl and adjustment ring may be closed by a seal 234, which has a continuous annular sealing member with inner and outer lips 236 and 238 attached to the lower end of the adjustment ring. An outer cylindrical surface 239 in the form of a depending shield or plate 240 attached to the adjustment ring may be opposite the outer lip of the sealing member and the bowl may have an inner cylindrical surface 242 extending upwardly from its lower edge to the point where the bowl thread starts. The adjustment ring may have a plurality of sockets 244 at suitable intervals around the crusher with a rod 246, each surrounded by a coil spring 248 or the like. The coil spring is supported on a ring 249 held in place by a snap ring so that the springs force the rods up, thereby keeping the seal against the bottom of the adjustment ring. However, as the liner and mantle wear away and the bowl is adjusted down, the bottom 250 of the bowl threads will contact the sealing member 234 about half way down. Further adjustment of the bowl down will push the seal down compressing the springs 248. When the mantle and liner are sufficiently worn that they must be replaced, the bowl is turned back up and the springs cause the seal to follow until the seal hits the bottom of the adjustment ring. During approximately the first half of bowl adjustment down, the inner lip 236 of the seal wipes against the bowl surface 242, and during approximately the second half the outer lip 238 wipes against the adjustment ring surface 239. The arrangement shown has the advantage that the rods and springs are up inside the adjustment ring and will not be clogged by dirt, dust and moisture.

On occasion the crusher will stall due to tramp iron and other foreign material in the crushing cavity or a power failure and it is desirable to release the machine by raising the bowl and adjustment ring assembly. A plurality of jacks 252 are provided around the crusher, each of which may be mounted on a pedestal or post 254 having a push rod 256 above it passing through the upper flange of the main frame to contact the adjustment ring. When high pressure fluid is supplied to the jacks by a suitable connection 258, the upthrust of the jacks will raise the adjustment ring and compress the spring clusters. The spring clusters 260 may be grouped in pairs, as at 262 in FIGURE 2, with a jack 252 between adjacent pairs.

As shown in FIGURES 2 and 5, the adjustment mechanism D may take the form of two rams 300, shown as mounted on the adjustment ring at 302, 180° apart, although it might be otherwise. Each includes a yoke 304 with a stub 306 extending from the lower end through an opening in the adjustment ring. The ram cylinder 308 is pivoted to the ears of the yoke at 310. The piston 312 of the ram has a nose 314 on the outer end connected to it by a pin 316. A suitable hydraulic connection 318 is connected to the rear of the cylinder to supply high pressure fluid, as desired, to cause the piston to extend. A suitable spring 320 may be connected at one end to the piston pin 316 and at its other end to the cylinder plug 322 so that the ram will have a power excursion and a spring return.

In FIGURE 6, the nose of the ram is shown as being concave or indented on each side thereof, as at 324, so that the forward edge 326 will properly engage the teeth on torque ring 232.

The lower end of the yoke pin extends below the adjustment ring and is surrounded by a coil spring 328 or the like, one end of which is connected to the pin at 330 and the other end to the adjustment ring at 332. The spring tends to bring the ram to a generally radial position on the main frame. Thus, when the rams are disposed to rotate the bowl either clockwise or counterclockwise in FIGURE 2, they will always be held in against the teeth of the torque ring. To reverse the direction of rotation, the ram is lifted up about its pivot 310 until it clears the outside of the top cap, then manually rotated and lowered on the other side. But in either position, the spring 328 will hold it in against the torque ring.

The rams may be fast enough for normal adjustment. For changing worn out liners, which requires backing the bowl all the way out, they may be far too slow. Therefore, a sheave 334, shown in FIGURE 1, may be mounted on the adjustment ring, at 335 in FIGURE 2, to pivot, one way or the other, so that the bowl may be rapidly turned up or down by a cable and crane, if desired. To prevent the bowl from rotating during crushing, a lock 336 in the form of a pawl is held by a spring 338 against the torque ring and pivoted on the adjustment ring at 340. The direction of rotation of the head is such that it tends, during normal crushing, to rotate the bowl up. The lock prevents such rotation. When the rams adjust the bowl down, the teeth of the torque ring merely ratchet by the lock 336. When the mantle and liner are worn out and need to be replaced, the lock 336 may be pivoted over center away from the torque ring while the bowl is being turned up.

The head E includes a main shaft 400 with a tapered lower end 402 fitting in a bushing 404 in the eccentric 20. The head proper 406 has a spherical lower surface 408, described about the center of gyration X, and engaging the socket or seat on the main frame. A conic outer surface 410 supports a mantle 412 held down by a head nut 414 which threads at 416 to the upper end of the main shaft and applies a downthrust through a torch ring 418 to a mantle extension 420 which engages the upper end of the mantle. An interlock may be provided between the mantle and mantle extension which includes a projection 422 on the extension which fits into a recess or socket 424 in the throat of the mantle, so that the head will be self-tightening with pouring openings 425 for backing material.

The head has a depending skirt 426 with a seal underneath, indicated generally at 428. The seal, as shown in FIGURE 3, includes upper and lower retainers 430 and 432, connected to the head, which engage a ring 434 between them. The upper retainer 430 has a spherical lower surface 436 which engages a spherical upper surface 438 on a sealing flange 440 on the ring. The lower surface 442 of the sealing flange is also spherical and engages a spherical upper surface 444 on the lower retainer. All of the spherical surfaces are concentric with the gyration point X.

The ring has an upstanding body portion 446 which has a somewhat upwardly and inwardly tapered inner surface 448 and flares out somewhat on top at 450. An outwardly opening continuous, annular groove or seat 452 is provided in the head support 40 and a somewhat distortable seal ring 454 is positioned in this groove which may be of rubber or neoprene or a rubber substitute. The annular seal 454 engages the tapered surface 448 of the ring and provides a firm sealing contact but flexibly holds the ring in place as the head gyrates. The ring itself is somewhat L-shaped, in cross section, opening outwardly and defining a grease channel 456 which may be packed with grease during assembly. Any clearance between the retainers and seal ring will be between surfaces 436 and 438 and, accordingly, the grease will work its way out into the chamber 458 between the retainers and then down between surfaces 442 and 444. Dirt, grit and dust from the crushing cavity, to get into the seal, will have to move against the direction of grease movement and, accordingly, will be forced back out of the seal. Lubricant notches 460 may be provided at suitably spaced intervals around the seal seat 452 so that the normal lubricant to the socket 44 from the lubricating channels, as at 462 in the head, will flow past the seal and down into the gears through suitable channels 464 in the head support.

The seal parts interfit so that during normal operation, the flexible annular seal 454 is compressed somewhat against the inner tapered surface 448 of the ring. But at the same time there is no direct metal-to-metal contact between the ring and support. Also, there is enough slack or spacing so that if the head varies from its normal gyratory movement, the flexible seal may be further compressed without the ring contacting the support. Also, enough initial compression of the flexible seal is provided so that even if the head rises somewhat due to abnormal operation, sufficient sealing contact will be maintained between the seal and ring. Also, since the ring tends to move with the head but is restrained against it by the annular seal, sealing contact will be maintained between them at all times without the danger of metal-to-metal contact between the support and the ring which would result in breakage.

It will be realized that whereas a practical and operative device has been described and claimed, nevertheless many changes may be made in the size, shape, number and disposition and relation of parts without departing from the spirit of the invention. It is therefore wished that the description and drawings be taken as in a broad sense illustrative or diagrammatic rather than as limiting to the precise showing.

The use, operation and function of the invention are as follows:

A gyratory crusher is provided with a mechanism for automatically but controllably eliminating thread clearance between the bowl and adjustment ring. The arrangement has the advantage that the clamp units are completely covered by the top cap and are in no way accessible to dirt, dust and foreign material. Thus, no dirt can get into the hydraulics or springs and the hydraulic connections may be tight and do not constitute a problem. Further, the exterior appearance of this machine is not marred.

Further, the clamp units may be positioned around the machine according to any suitable spacing and in any number to provide any desired amount of upthrust. For example, just sufficient upthrust may be provided to counterbalance the weight of the bowl structure so that thread clearance alone is eliminated during normal operation of the machine. The bowl may be prevented from rotating by a suitable positive lock, or sufficient additional upthrust may be provided in the clamp units to automatically lock the bowl.

The clamp units also key or tie the locking ring to the adjustment ring, so that the threads of the locking ring become, in effect, a continuation of the threads on the adjustment ring. Since the bowl is keyed to the top cap above the locking ring, when the torque ring is rotated by the rams or by a separate cable and crane, the bowl will be rotated either down or up during adjustment or replacement of the manganese wearing parts.

The use of washer type springs has the advantage of a short stroke with high thrust, but it should be understood that any suitable spring arrangement between the adjustment ring and locking ring may be used. Releasing the locking ring and bowl for adjustment is preferably hydraulic.

The head and bowl carry opposed renewable crushing mebers, identified as a mantle on the head and a bowl liner on the bowl. These opposed parts define a crushing cavity to receive material fed downwardly and, preferably, inwardly from above. As the eccentrically apertured sleeve 20 rotates, the head is gyrated about the point X of FIGURE 1, and a crushing nip or approach of head to bowl passes around the crushing cavity. The opposed crushing members are subjected to wear and are renewed at various intervals, depending upon the particular material crushed. From time to time, uncrushable material, such as dipper teeth or other tramp iron, may enter the crushing cavity and may stall the crusher. It is of vital importance that the stalled crusher be restored to use with as little delay as possible. In crushing practice the stalling of one crusher may stop the operation of an entire milling plant or of some substantial part of it.

The present structure has various advantages, including easy release of stalled crusher and, also, easy adjustment of the relationship between the opposed crushing parts. Where hard materials are being crushed, for example, taconite, the wear on the opposed crushing members, of manganese steel or the like, may be very rapid, and frequent adjustment may be necessary. The bowl structure as a whole is rotated to obtain adjustment in relation to the adjustment ring 100.

In considering, first, the question of release, the adjustment ring 100 is normally maintained firmly pressed downwardly against an upper edge portion of the main frame 12. The relationship of the parts is shown in detail in FIGURE 8. The entire supporting contact is provided nomally by the opposed conic surfaces 110. During normal crushing the entire bowl support is, therefore, provided by the outer surface of the main frame flange 106, which, as is clear from FIGURES 1 and 8, is generally conic. However, when uncrushable material is present in the crushing cavity the ring 100 is lifted, at one side of the cavity, in such fashion as to separate the opposed conic surfaces of ring and main frame flange. A rolling outside contact is provided between the opposed surfaces 112 and 114. In any event, it is the contact of the ring 100 with some part of the outer surface of the flange 106 which constitutes the sole supporting connection between the bowl structure as a whole and the main frame. This is in contrast to previous structures, such as are shown, for example, in Patent No. 2,358,038, Symons et al., dated September 12, 1944, in which a simultaneous contact is indicated between the exterior and interior faces of the main frame flange and the exterior and inner faces of a channel in a corresponding adjustment ring. In the structure of the above mentioned patent, during normal crushing the adjustment ring has an inner portion which fits like a cork or stopper within a surrounding surface of the main frame. It turns out, in practice, that it is difficult, effectively, to maintain any such double contact. The attempt to do so causes difficulties of wear and damage to the opposed parts which, in practice, are extreme.

In crushers such as the one shown, it is important to provide quick and easy adjustment. An advantage of the described system is that it is effective quickly to release the bowl for adjustment when adjustment is desired.

When the bowl is to be adjusted, the clamping thrust is released and the rams index the bowl to bring the cavity back to size. Also, during crushing the peripheral bowl load is on a fixed stop and not on the rams.

With reference to the wearing parts, and particularly to the bowl liner shown in FIGURES 9 and 10, the liner 140 has at its upper edge a continuous, outwardly disposed flange or ledge 142 which serves as a reinforcement for the upper edge of the bowl liner. This reinforcing flange 142, which is continuous, has an upwardly and outwardly continuous lower surface. Since the outer edge of the flange 142 is of a diameter less than the diameter of the inner edge of the bowl insert or adapter, the bowl liner may easily be upwardly inserted from below, and may be downwardly freely removed through the bowl structure when removal is desired. Simple means, however, are provided for holding the bowl liner in position without the use of a complicated structure and without the use of any securing means which can get so packed with material or dust during use as to be difficult of removal. As will be clear from FIGURES 1 and 9, the bowl insert or adapter has a generally plane upper surface. Wedges may be thrust inwardly toward the upper edge of the bowl liner by the thrust nuts. Release of the bowl liner is simple and easy, since all that is necessary is to back off the thrust nuts or cut the bolts 150 with a torch or the like.

The sealing arrangement 234 below the bowl threads has the advantage of reducing the over-all crusher height since the seal first wipes against one surface and then against the other. The springs should be constructed to force the seal up with sufficient thrust to overcome gravity and the down friction of the bowl. The arrangement has the additional advantage that the springs are totally enclosed in the adjustment ring behind and fully protected by the seal itself. Thus, no dirt, dust and foreign matter from the crushing operation can clog or jam the springs or the rods that hold the springs.

The rams provide for easy adjustment to rotate the bowl in either direction. Only one man is required to pivot the ram up in its yoke support and then turn the ram and yoke from one side to the other. The spring automatically centers or pulls the ram toward the bowl to engage the torque ring. The ram has been shown as hydraulic, but it might be air operated or otherwise. Also, two rams have been shown, but more or less might be used. It is preferred that two be used, approximately 180° apart, so that the inward component of ram thrust from one will be counterbalanced against the other. Thus, the bowl has no tendency to bind due to ram thrust. The rams have been shown with a power thrust and spring return but they might be double acting.

Making the gear on the eccentric and counterweight separate has the advantage that the gear itself may be in the form of a separate, thin ring which is much easier to handle during machining. The counterweight is bulky and may be made an integral part of the eccentric or may be separate, as desired. But, in any event, the important point is that the gear is separate from the counterweight which greatly reduces tooling and machining expense.

The drive to the head is the countershaft in a box which joins the outer housing of the main frame and the center support for the head. The inside dimension of the box does not have to be large enough to allow the pinion to be inserted, since the pinion is dropped down into the pocket in the main frame from above and the countershaft is then connected to the pinion. This allows the drive to come in through one of the arms between the outer housing and the center support. This has the advantage that the high torques and stresses from the drive are supported directly by one of the frame arms. In effect, the countershaft is supported in a structure of maximum strength.

The head seal has the advantage that there is no metal-to-metal contact between the head and support. Also, there is enough slack so that if the head varies in its normal gyratory movement, the flexible seal may be further compressed without the ring contacting the support. Enough initial compression of the seal is provided so that even if the head rises somewhat, sufficient sealing contact will be maintained.

I claim:

1. In combination, in a crusher of the type which includes a circumferential main frame and a head within the frame and means for gyrating it, a support for the head, and a floating closure between the head and the support which includes a flexible, compressible annulus contacting the support and a movable sealing member slidable in the head, said sealing member abutting and surrounding said annulus and being out of contact, except through said annulus, with the support.

2. The structure of claim 1 further including a guide member for the movable sealing member removably secured to a lower portion of the head, whereby the guide member and sealing member may be removed from the head.

3. The structure of claim 1 characterized in that the support includes a normally fixed portion having a circumferential positioning channel in which the annulus is received.

4. The structure of claim 3 further characterized in that said annulus is readily removable upwardly from said channel when the head is upwardly removed.

5. The structure of claim 1 further characterized in that the sealing member has an upwardly and inwardly tapered inner surface proportioned to abut the annulus at all normal positions of the head.

6. The structure of claim 1 further characterized in that the compressible annulus is effective to maintain the movable sealing member centered in predetermined but slightly yielding relation to the support.

References Cited in the file of this patent

UNITED STATES PATENTS

| | | |
|---|---|---|
| 1,761,240 | Smith | June 3, 1930 |
| 2,288,069 | Browning | June 30, 1942 |
| 2,326,750 | Browning | Aug. 17, 1943 |
| 2,468,342 | Munro | Apr. 26, 1949 |
| 2,916,219 | Broman | Dec. 8, 1959 |

FOREIGN PATENTS

| | | |
|---|---|---|
| 773,853 | Great Britain | May 1, 1957 |